(12) United States Patent
Lu et al.

(10) Patent No.: US 11,819,756 B2
(45) Date of Patent: Nov. 21, 2023

(54) CONTROLLER AND WIRE TAKE-UP ASSEMBLY THEREOF

(71) Applicant: DEXIN CORPORATION, New Taipei (TW)

(72) Inventors: Ho-Lung Lu, New Taipei (TW); Tsai-Chuan Lin, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 109 days.

(21) Appl. No.: 17/556,947

(22) Filed: Dec. 20, 2021

(65) Prior Publication Data

US 2023/0086673 A1    Mar. 23, 2023

(30) Foreign Application Priority Data

Sep. 23, 2021   (TW) ................................. 110135241

(51) Int. Cl.
*A63F 13/24* (2014.01)
*A63F 13/23* (2014.01)

(52) U.S. Cl.
CPC .............. *A63F 13/24* (2014.09); *A63F 13/23* (2014.09)

(58) Field of Classification Search
CPC ................................. A63F 13/24; A63F 13/23
See application file for complete search history.

(56) References Cited

U.S. PATENT DOCUMENTS

| 4,509,383 | A | * | 4/1985 | Yeh | H02G 11/02 74/471 XY |
|---|---|---|---|---|---|
| 5,168,969 | A | * | 12/1992 | Mayhew | H02G 11/02 273/148 B |
| 5,489,010 | A | * | 2/1996 | Rogers | H02G 11/02 242/396.6 |
| 5,732,331 | A | * | 3/1998 | Harms | H04M 1/0254 379/433.05 |
| D474,183 | S | * | 5/2003 | Mesa | D21/333 |
| 7,106,301 | B2 | * | 9/2006 | Smith | G06F 3/03543 345/169 |
| 8,690,600 | B1 | * | 4/2014 | Zeolla | G06F 1/1628 439/502 |
| 11,167,209 | B2 | * | 11/2021 | Lu | A63F 13/98 |
| 11,389,721 | B2 | * | 7/2022 | Khaira | A63F 13/23 |
| 11,504,613 | B2 | * | 11/2022 | Lu | A63F 13/98 |

(Continued)

*Primary Examiner* — Dmitry Suhol
*Assistant Examiner* — Carl V Larsen
(74) *Attorney, Agent, or Firm* — Li & Cai Intellectual Property Office

(57) ABSTRACT

A controller and a wire take-up assembly thereof are provided. The wire take-up assembly can be installed on a side of a grip, so as to accommodate a connection wire. The wire take-up assembly includes an accommodating body and an operating component. The accommodating body has an accommodating groove, and the accommodating groove can accommodate a part of the connection wire. A part of the operating component is located in the accommodating groove. The operating component can move relative to the accommodating body, so that the connection wire in the accommodating groove is pulled by the operating component and a part of the connection wire exposed outside the accommodating groove is accommodated into the accommodating groove. Accordingly, the controller and the wire take-up assembly thereof can quickly accommodate the connection wire.

15 Claims, 16 Drawing Sheets

(56) References Cited

U.S. PATENT DOCUMENTS

| | | | |
|---|---|---|---|
| 2004/0256188 A1* | 12/2004 | Harcourt | B65H 75/4486 |
| | | | 191/12.2 A |
| 2006/0126883 A1* | 6/2006 | Thalheimer | H04R 5/02 |
| | | | 381/124 |
| 2007/0207862 A1* | 9/2007 | Calhoun | A63F 13/23 |
| | | | 463/46 |
| 2015/0281422 A1* | 10/2015 | Kessler | H04M 11/007 |
| | | | 455/557 |
| 2016/0012941 A1* | 1/2016 | Ledwith | H02G 11/02 |
| | | | 156/280 |
| 2017/0056762 A1* | 3/2017 | Gafni | A63F 13/235 |
| 2019/0124190 A1* | 4/2019 | Jullien | H04M 1/21 |
| 2020/0155928 A1* | 5/2020 | Guo | A63F 13/98 |
| 2020/0324197 A1* | 10/2020 | Ho | A63F 13/26 |
| 2022/0072416 A1* | 3/2022 | Lu | A63F 13/92 |

* cited by examiner

CONTROLLER AND WIRE TAKE-UP ASSEMBLY THEREOF

CROSS-REFERENCE TO RELATED PATENT APPLICATION

This application claims the benefit of priority to Taiwan Patent Application No. 110135241, filed on Sep. 23, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a grip, and more particularly to a controller and a wire take-up assembly thereof.

BACKGROUND OF THE DISCLOSURE

In order to allow both hands to operate an electronic device with dexterity, most users will install a controller on the electronic device to assist in operation of the electronic device. A conventional controller includes two operation grips installed on both sides of the electronic device. One of the two operation grips is electrically coupled to the electronic device, and is further electrically coupled to another one of the two operation grips by a connection wire. However, taking up the connection wire of the conventional controller can be a difficult task, which causes the user to spend much time arranging the connection wire.

SUMMARY OF THE DISCLOSURE

In response to the above-referenced technical inadequacy, the present disclosure provides a controller and a wire take-up assembly thereof, so as to overcome the problem of having difficulty to take up a connection wire of a conventional controller.

In one aspect, the present disclosure provides a wire take-up assembly of a controller. The wire take-up assembly is configured to be installed on a grip, so as to accommodate a connection wire. The wire take-up assembly includes an accommodating body and an operating component. The accommodating body has an accommodating groove, and the accommodating groove is configured to accommodate a part of the connection wire. A part of the operating component is located in the accommodating groove. The operating component is configured to move relative to the accommodating body, so that the connection wire in the accommodating groove is pulled by the operating component and a part of the connection wire exposed outside the accommodating groove is accommodated into the accommodating groove.

In another aspect, the present disclosure provides a controller. The controller can be installed on two sides of an electronic device. The controller includes two grips, a connection wire, a wire take-up assembly, and a communication module. Each of the two grips includes a gripping body, a signal generating module, and a plurality of operating members. The gripping body includes a mounting unit and a gripping unit, the mounting unit is configured to be disposed on one of the two sides of the electronic device, and the gripping unit is assembled to the mounting unit. The signal generating module is disposed in the gripping body. Each of the operating members is electrically coupled to the signal generating module and is configured to be operated such that the signal generating module generates a plurality of control signals that respectively correspond to the operating members. One of two ends of the connection wire is electrically coupled to one of the signal generating modules of the two grips, and another one of the two ends of the connection wire has a plug member configured to be pluggably and electrically coupled to another one of the signal generating modules of the two grips. The wire take-up assembly is installed on one of the two grips, and includes an accommodating body and an operating component. The accommodating body has an accommodating groove, and the accommodating groove is configured to accommodate a part of the connection wire. The plug member of the connection wire is exposed from the accommodating body. A part of the operating component is located in the accommodating groove. The operating component is configured to move relative to the accommodating body, so that the connection wire in the accommodating groove is pulled by the operating component and a part of the connection wire exposed outside the accommodating groove is accommodated into the accommodating groove. The communication module is disposed in one of the gripping bodies of the one of the two grips, and is electrically coupled to one of the signal generating modules of the two grips that is located in the one of the gripping bodies of the one of the two grips. The communication module is electrically coupled to another one of the signal generating modules of the two grips through the connection wire. The communication module is configured to receive any one of the control signals, so as to transmit to the electronic device.

Therefore, by virtue of "the operating component being configured to move relative to the accommodating body, so that the connection wire in the accommodating groove is pulled by the operating component and the part of the connection wire exposed outside the accommodating groove is accommodated into the accommodating groove," the controller and the wire take-up assembly thereof provided by the present disclosure can quickly accommodate the connection wire.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
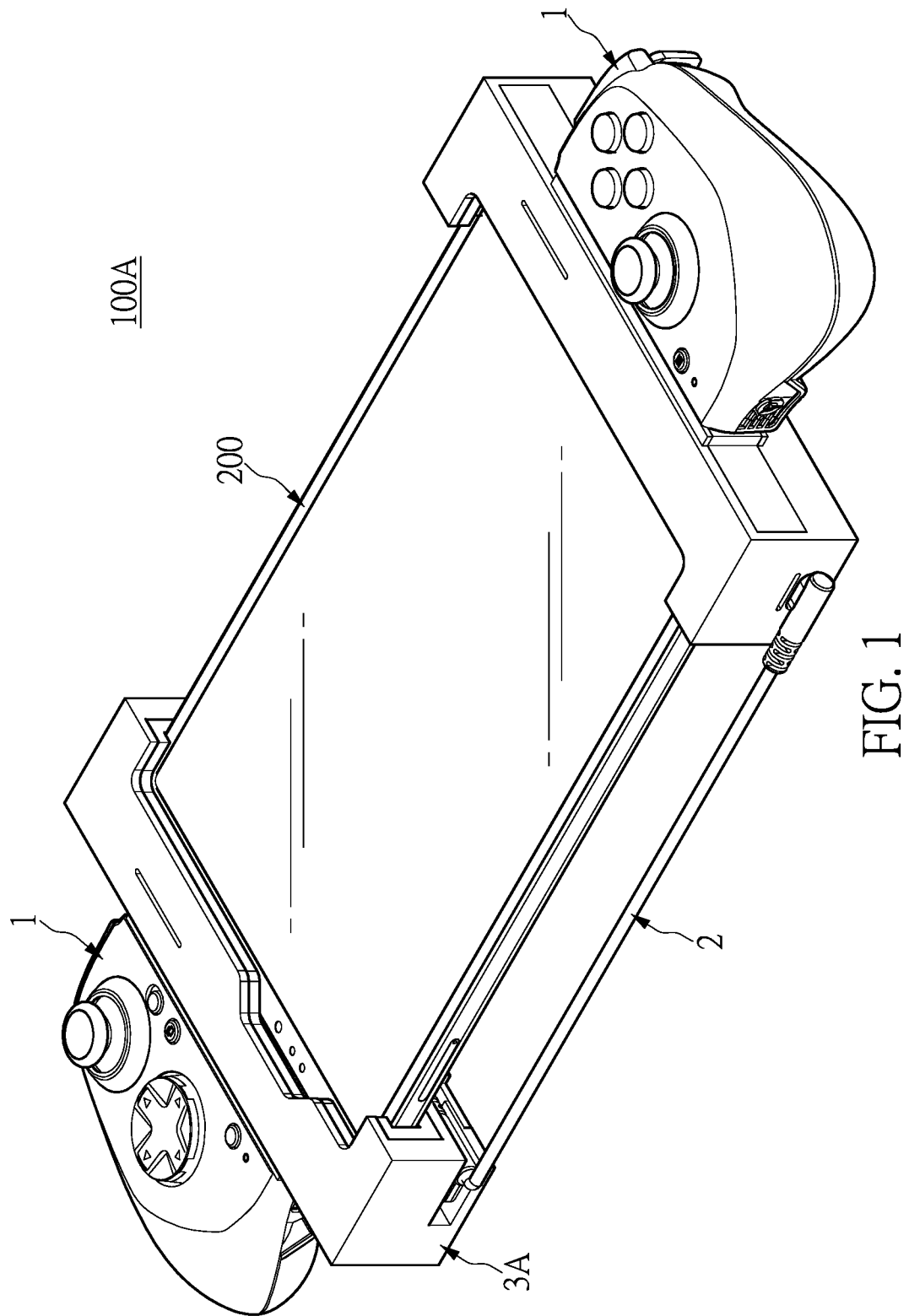
FIG. 1 is a schematic perspective view showing a controller being installed on an electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIRST EMBODIMENT

Figure 2:
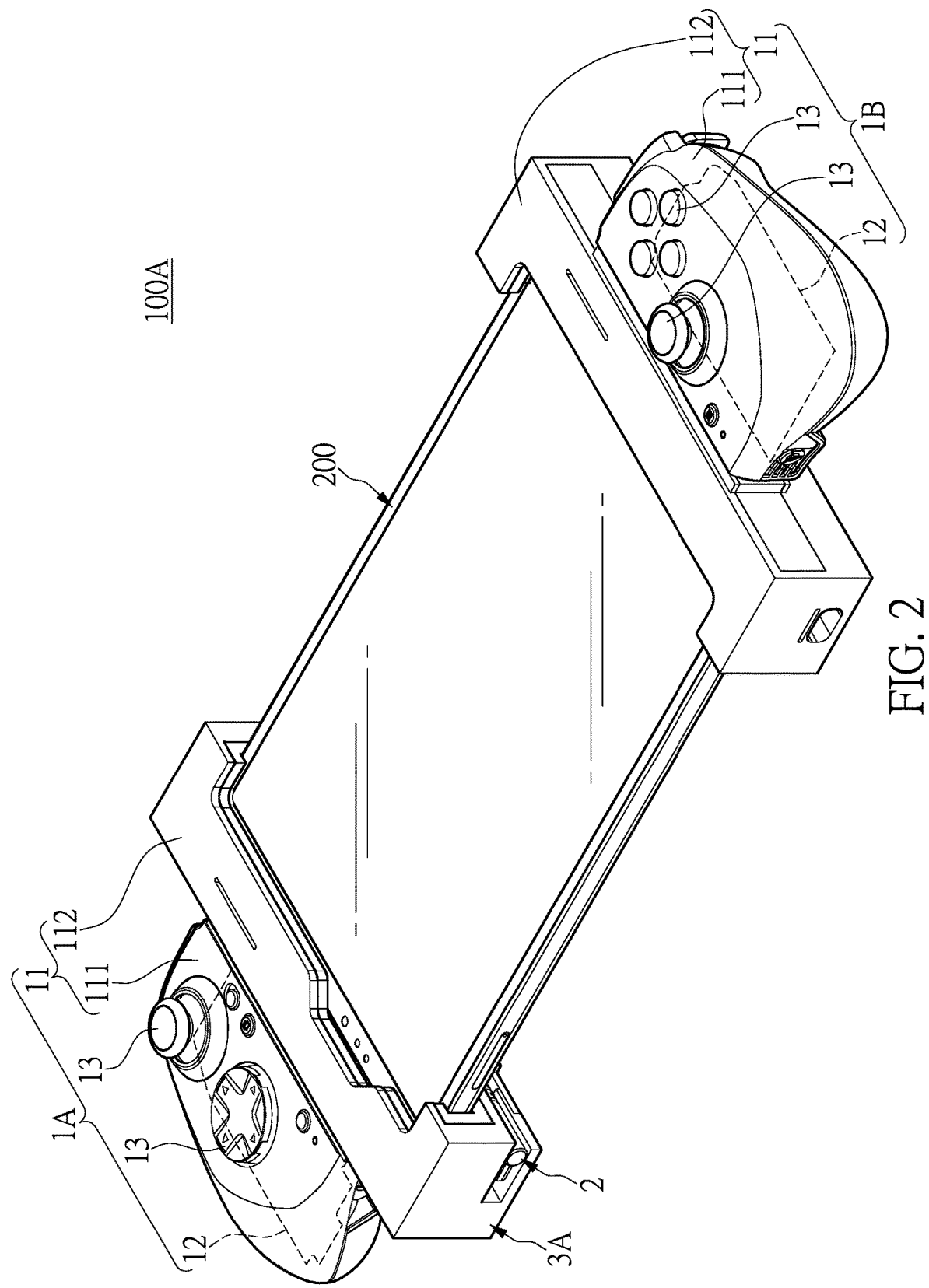
FIG. 2 is another schematic perspective view showing the controller being installed on the electronic device according to the first embodiment of the present disclosure.
Figure 3:
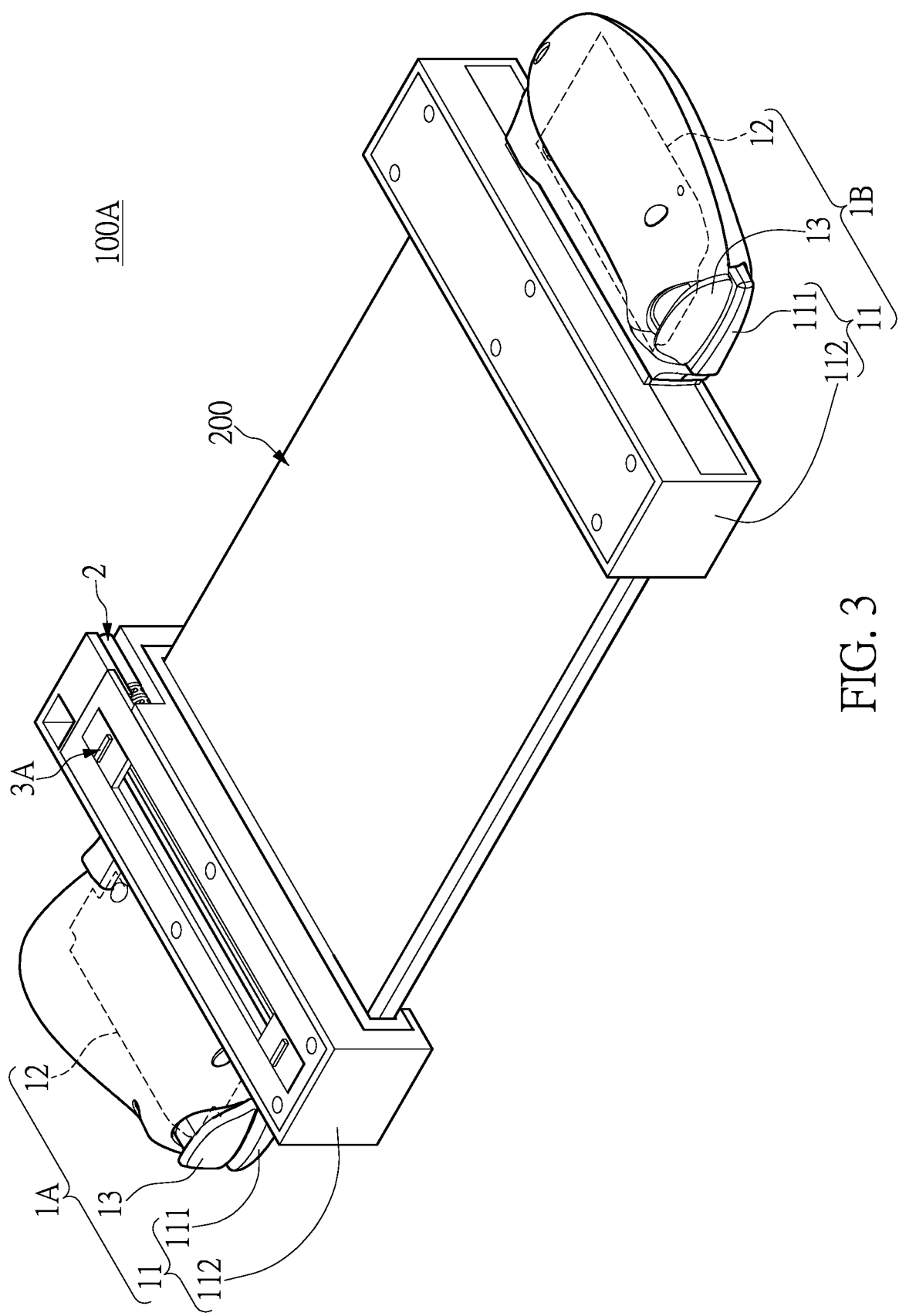
FIG. 3 is a schematic perspective view showing FIG. 2 from another angle of view.
Figure 4:
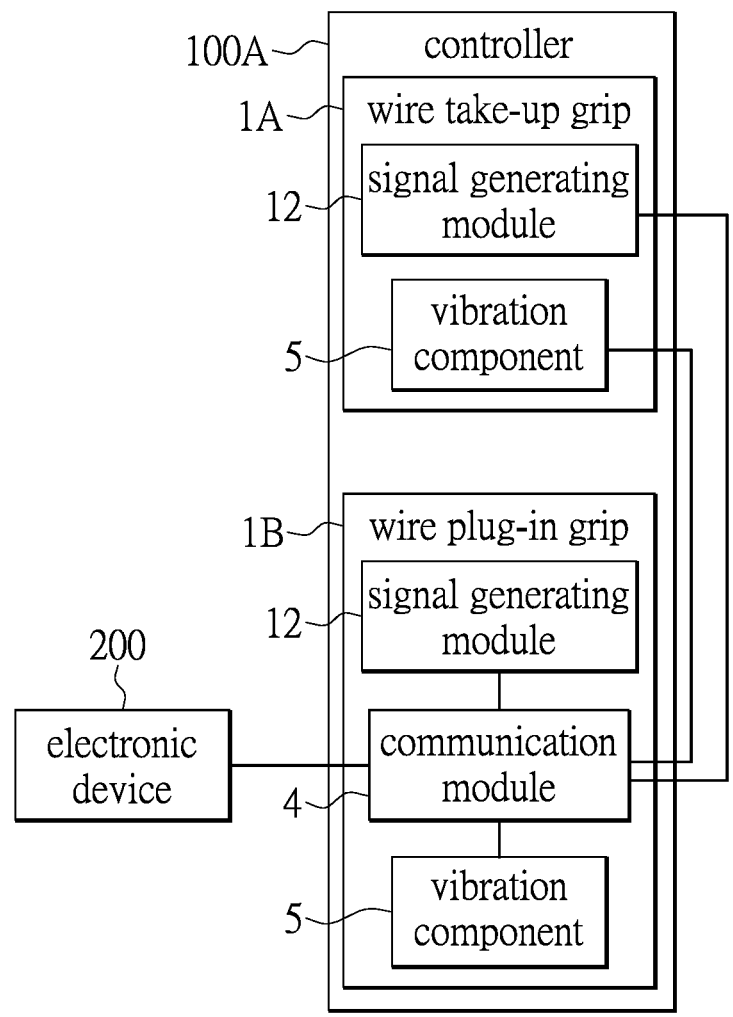
FIG. 4 is a circuit block diagram of the controller according to the first embodiment of the present disclosure.

Referring to FIG. 1 to FIG. 13, a first embodiment of the present disclosure provides a controller 100A. As shown in FIG. 1 to FIG. 3, the controller 100A can be installed on two sides of an electronic device 200 (e.g., a tablet computer or a mobile phone). With reference to FIG. 1 to FIG. 3, the controller 100A includes two grips 1 (i.e., two grips 1A, 1B shown in FIG. 2 and FIG. 3), a connection wire 2 that is electrically coupled to the two grips 1, a wire take-up assembly 3A disposed in one of the two grips 1, and a communication module 4 that is disposed in any one of the two grips 1 (as shown in FIG. 4).

It should be noted that the two grips 1, the connection wire 2, the wire take-up assembly 3A, and the communication module 4 in the present embodiment are jointly defined as the controller 100A, but the present disclosure is not limited thereto. For example, the wire take-up assembly 3A can be independently used (e.g., being independently implemented, manufactured, or sold) or can be used in cooperation with other components. The following description will describe the construction and connection relationship of each component of the controller 100A.

Referring to FIG. 1 to FIG. 3, the two grips 1 in the present embodiment are substantially symmetrical. The two grips 1 can be respectively installed on a left side and a right side of the electronic device 200 for being operated by a user's left and right hands, but the present disclosure is not limited thereto. For example, in certain embodiments of the present disclosure (not shown), the two grips 1 can also be asymmetrical to each other, and can be installed on two adjacent sides of the electronic device 200 (e.g., an upper side and a left side of the electronic device 200).

For ease of illustration, firstly, same structures and/or components of the two grips 1 will be introduced in the following description. Then, different structures and/or components between the two grips 1 will be introduced. Referring to FIG. 2 and FIG. 3, each of the two grips 1A, 1B includes a gripping body 11, a signal generating module 12 disposed in the gripping body 11, and a plurality of operating members 13 that are electrically coupled to the signal generating module 12.

Figure 5:
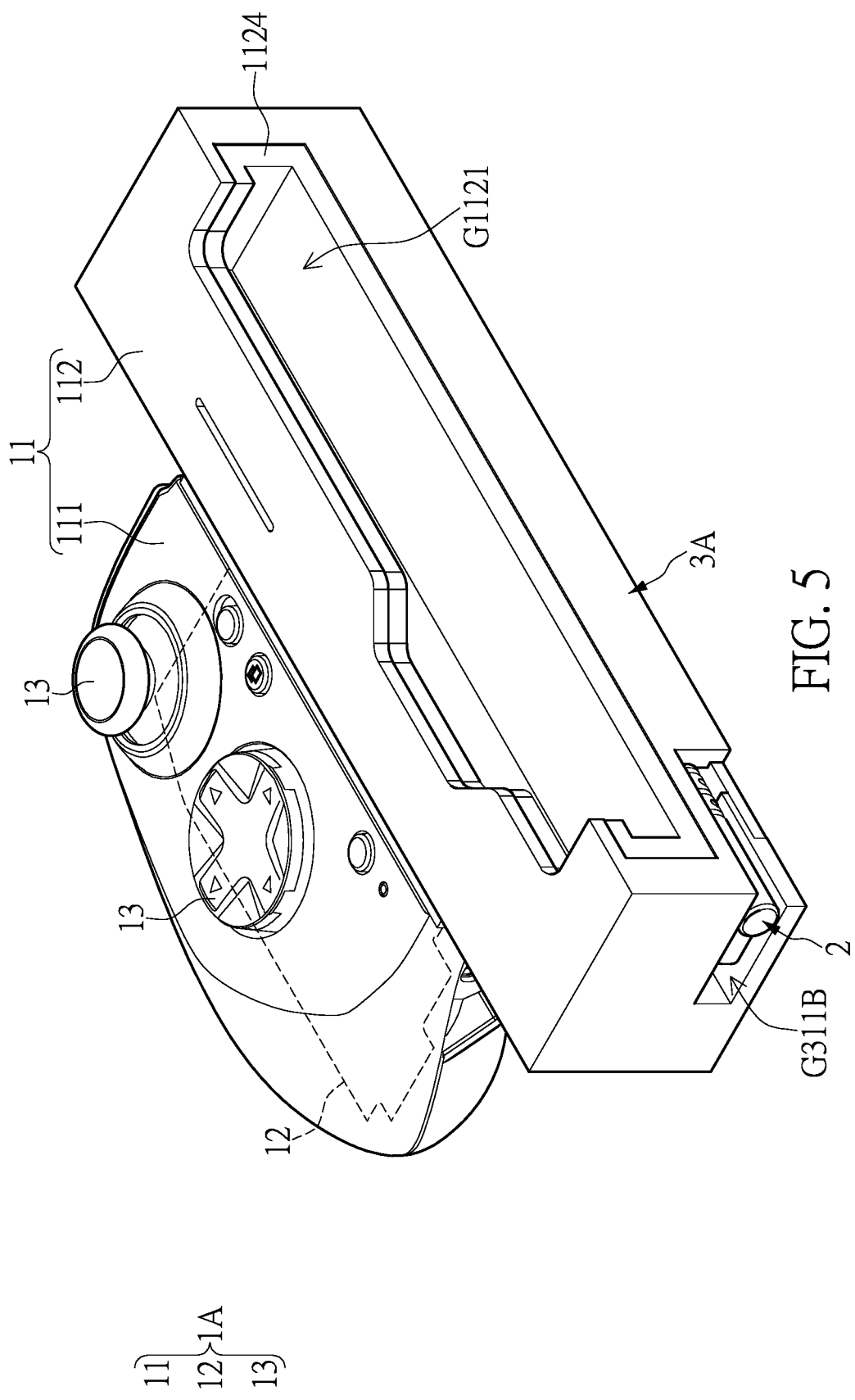
FIG. 5 is a schematic perspective view of a wire take-up grip according to the first embodiment of the present disclosure.
Figure 7:
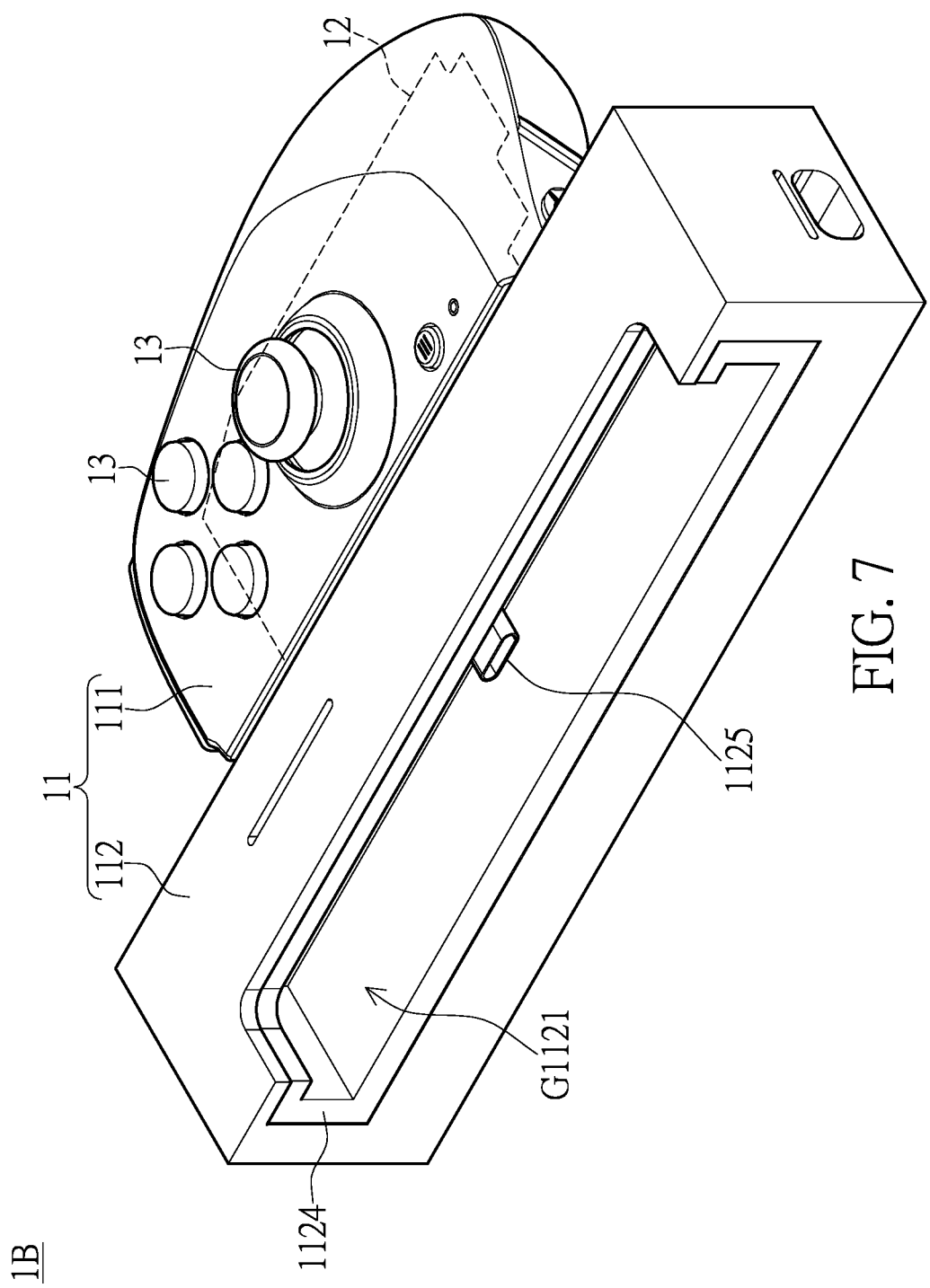
FIG. 7 is a schematic perspective view of a wire plug-in grip according to the first embodiment of the present disclosure.

Referring to FIG. 5 and FIG. 7, in the present embodiment, the gripping body 11 of each of the two grips 1A, 1B includes a gripping unit 111 and a mounting unit 112 that is detachably assembled to the gripping unit 111. In other words, the gripping unit 111 and the mounting unit 112 of each of the two grips 1A, 1B are each a single one-piece structure, and can be combined with each other, but the present disclosure is not limited thereto. For example, in certain embodiments of the present disclosure (not shown), the gripping unit 111 and the mounting unit 112 of each of the two grips 1A, 1B can also be reasonably designed to be integrally formed as a single one-piece structure (that is, the gripping unit 111 and the mounting unit 112 cannot be separated from each other).

Figure 6:
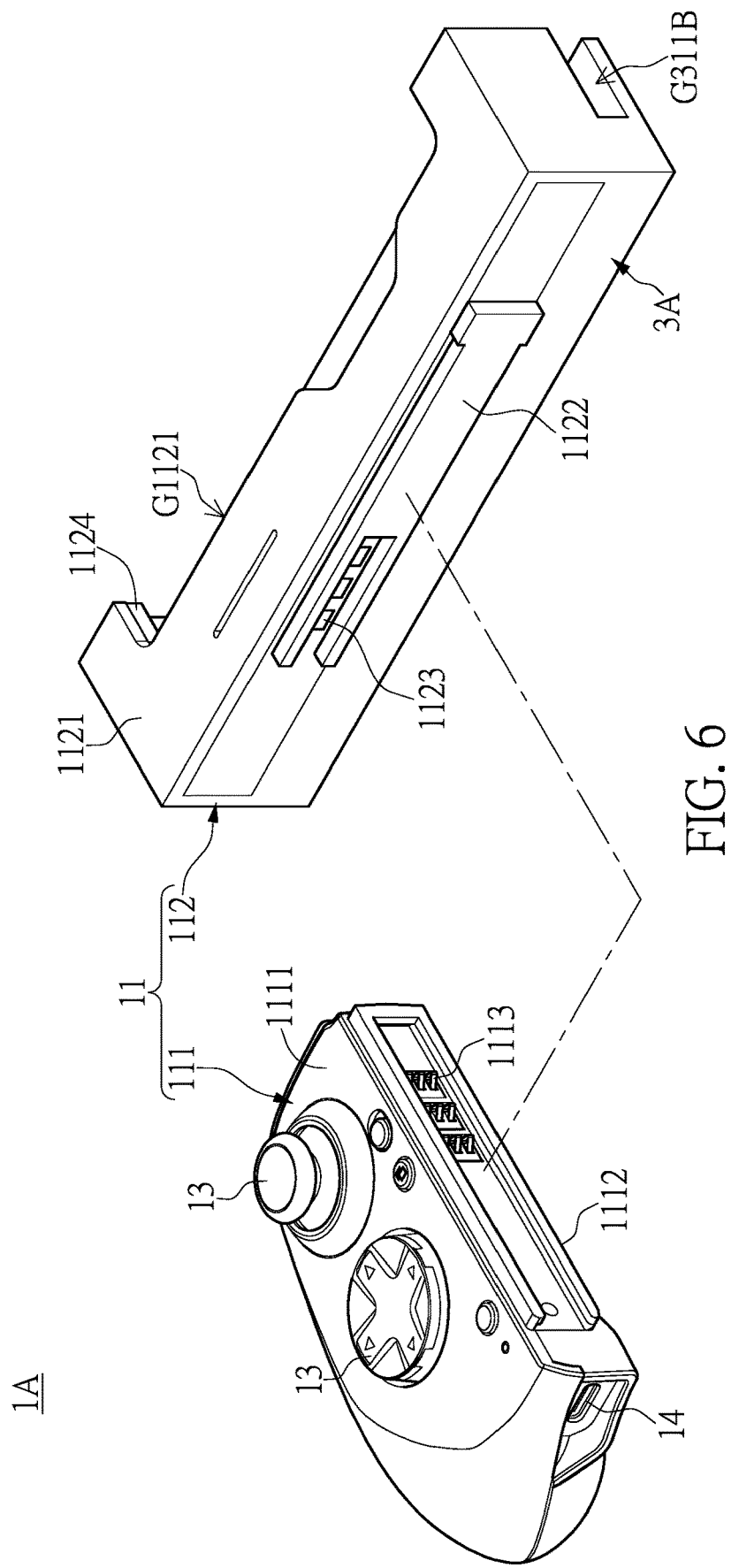
FIG. 6 is a schematic exploded view of the wire take-up grip according to the first embodiment of the present disclosure.
Figure 8:
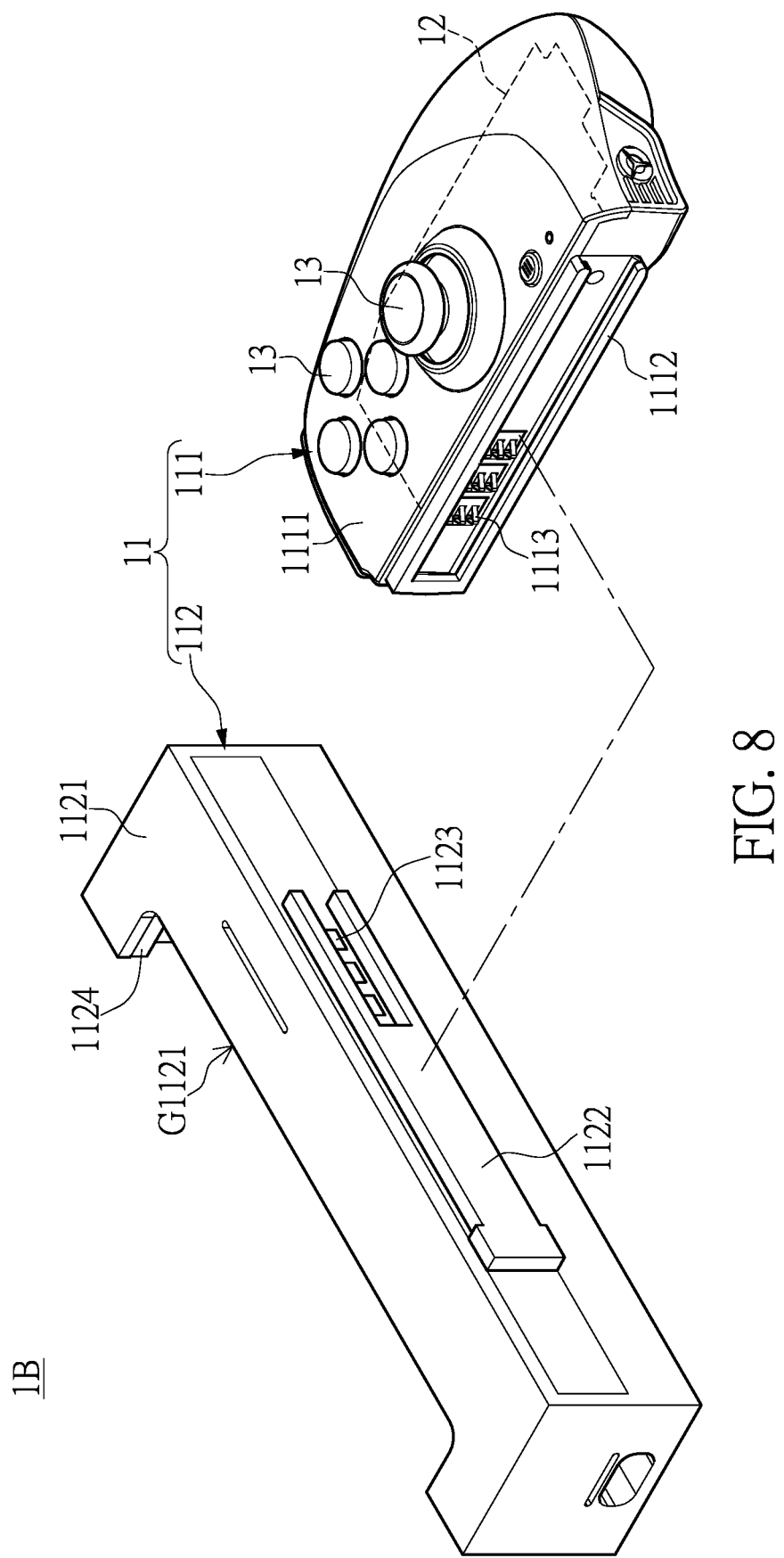
FIG. 8 is a schematic exploded view of the wire plug-in grip according to the first embodiment of the present disclosure.

Referring to FIG. 6 and FIG. 8, the gripping unit 111 includes a first body portion 1111, and a first holding portion 1112 and a first coupling portion 1113 that are disposed on the first body portion 1111. The first body portion 1111 is a shell-shaped structure, and the first holding portion 1112 is a track structure and is formed by extending from a side surface of the first body portion 1111. The first coupling portion 1113 is a conductive member (e.g., an edge connector), and is located on the side surface of the first body portion 1111 that has the first holding portion 1112. The first coupling portion 1113 is electrically coupled to the signal generating module 12.

Referring to FIG. 6 and FIG. 8, the mounting unit 112 can be fixed on one side of the electronic device 200. In the present embodiment, the mounting unit 112 includes a second body portion 1121, and a second holding portion 1122 and a second coupling portion 1123 that are disposed on the second body portion 1121. The second body portion 1121 is a C-shaped structure and has an abutting groove G1121, and the abutting groove G1121 can abut against an edge of the electronic device 200, so that the second body portion 1121 can be fixed on the electronic device 200 (as shown in FIG. 1 and FIG. 9).

In an exemplary embodiment, as shown in FIG. 5 and FIG. 7, the mounting unit 112 has an elastic layer 1124 disposed in the abutting groove G1121, and the elastic layer 1124 can be properly deformed to abut against the edge of the electronic device 200, thereby ensuring that the electronic device 200 is fixed and absorbing an external force when the electronic device 200 is impacted.

Referring to FIG. 6 and FIG. 8, the second holding portion 1122 is formed by extending from a side surface of the second body portion 1121 that faces the first holding portion 1112. The second holding portion 1122 is a track structure that can cooperate with and be fixed to the first holding portion 1112, and the second holding portion 1122 can be detachably assembled with the first holding portion 1112. The second coupling portion 1123 is a conductive member (e.g., an edge connector), and is located on the side surface of the second body portion 1121 that has the second holding portion 1122 (as shown in FIG. 9). The second coupling portion 1123 is electrically coupled to the signal generating module 12.

Figure 9:
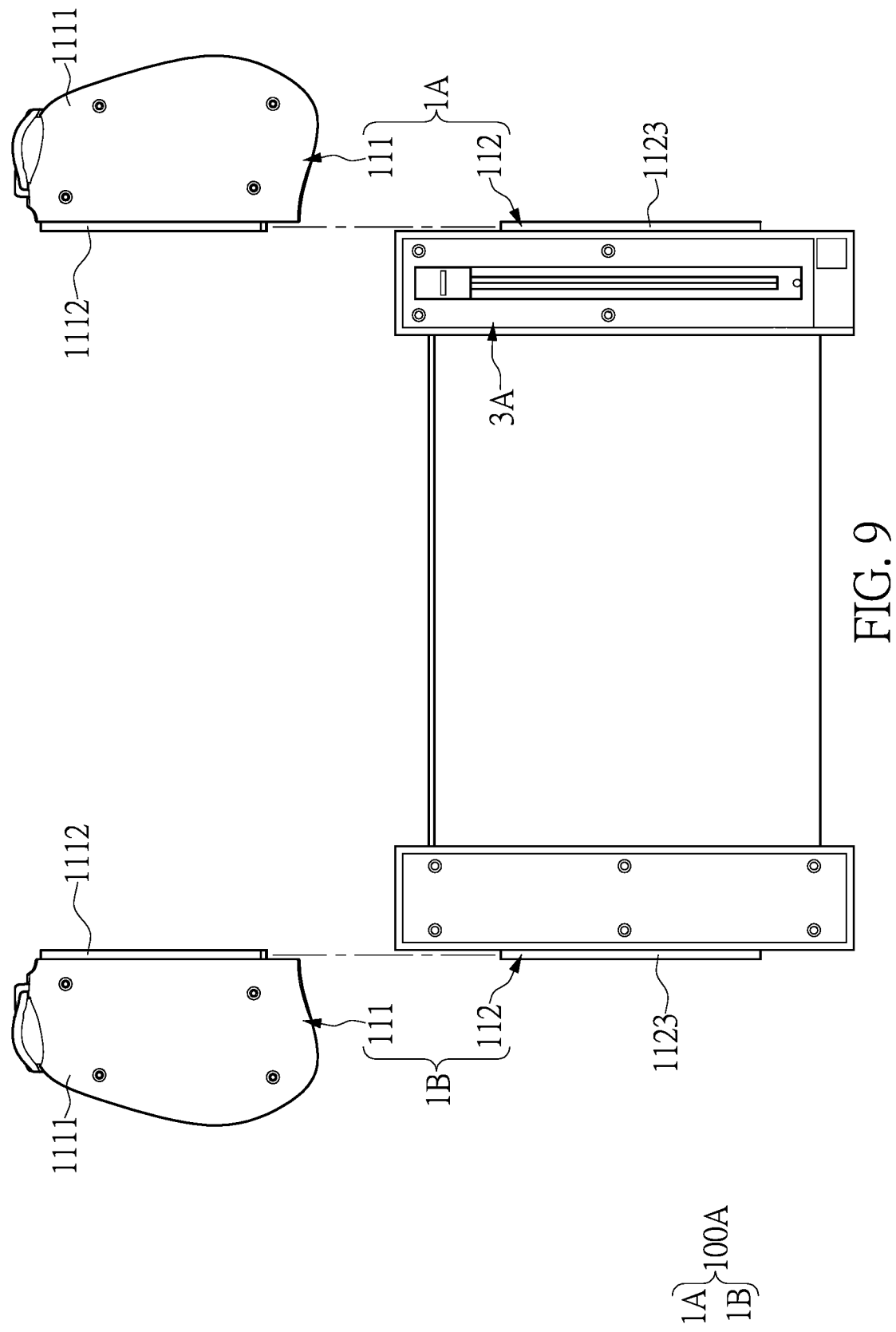
FIG. 9 is a schematic view showing a gripping unit being assembled to a mounting unit according to the first embodiment of the present disclosure.

Referring to FIG. 6, FIG. 8, and FIG. 9, in practical applications, the first holding portion 1112 of the gripping unit 111 can be assembled with the second holding portion 1122 of the mounting unit 112 along a width direction of the electronic device 200 (i.e., an extending direction of a short edge of a wide side surface of the electronic device 200), so that the gripping unit 111 is fixed on the mounting unit 112. In addition, when the first holding portion 1112 and the second holding portion 1122 are assembled with each other, the first coupling portion 1113 and the second coupling portion 1123 are electrically coupled to each other.

Referring to FIG. 4, FIG. 5, and FIG. 7, the signal generating module 12 in the present embodiment is a control circuit board, and is disposed in the gripping unit 111. The operating members 13 are disposed on the gripping body 11. One part of each of the operating members 13 is exposed from an outer side of the gripping body 11, and another part of each of the operating members 13 is located in an inner side of the gripping body 11. When each of the operating members 13 is operated (e.g., any one of the operating members 13 is pressed) by the user, the signal generating module 12 can generate a plurality of control signals that respectively correspond to the operating members 13.

It should be noted that, since the manners by which the signal generating module 12 can generate a corresponding one of the control signals by operating any one of the operating members 13 are known to those skilled in the art and are not the focus of the present disclosure, details thereof will not be described herein.

In addition, in the present embodiment, the two grips 1A, 1B transmit to each other in a wired manner That is, the two grips 1A, 1B are electrically coupled to each other through the connection wire 2. Specifically, one of two ends of the connection wire 2 is electrically coupled to the first coupling portion 1113 of the grip 1A, so as to be electrically coupled to the signal generating module 12 of the grip 1A by a corresponding one of the second coupling portions 1123. Another one of the two ends of the connection wire 2 has a plug member (located at an exposed end of the connection wire 2, and not labeled in the drawings), and the plug member can be pluggably and electrically coupled to the first coupling portion 1113 of the grip 1B, so as to be electrically coupled to the signal generating module 12 of the grip 1B by a corresponding one of the second coupling portions 1123. However, the present disclosure is not limited thereto. In practice, the plug member can be a Micro-USB connector or a Type-c connector, but the present disclosure is not limited thereto.

For example, in certain embodiments of the present disclosure (not shown), the connection wire 2 may also be directly and electrically coupled to the signal generating modules 12 of the two grips 1A, 1B. In other words, the connection wire 2 is not electrically coupled to the signal generating modules 12 of the two grips 1A, 1B by the first coupling portion 1113 and the second coupling portion 1123 of the two grips 1A, 1B.

Moreover, in certain embodiments of the present disclosure (not shown), each of the two grips 1A, 1B can have a wireless transceiver module electrically coupled to the signal generating module 12 thereof The wireless transceiver modules of the two grips 1A, 1B can wirelessly transmit to each other, or wirelessly transmit the control signals to the electronic device 200.

Then, the different structures and/or components between the two grips 1A, 1B will be introduced. For ease of illustration, the two grips 1A, 1B are further defined as a wire take-up grip 1A and a wire plug-in grip 1B (as shown in FIG. 2 and FIG. 3). In other words, in the present embodiment, the grip 1A can also be referred to as the wire take-up grip 1A, and the grip 1B can also be referred to as the wire plug-in grip 1B. The wire take-up grip 1A can be installed on the left side of the electronic device 200, and the wire plug-in grip 1B can be installed on the right side of the electronic device 200, but the present disclosure is not limited thereto. For example, according to practical requirements, the structures or components of the wire plug-in grip 1B can be reasonably applied to the wire take-up grip 1A. Conversely, the structures or components of the wire take-up grip 1A can also be reasonably applied to the wire plug-in grip 1B.

Referring to FIG. 4, FIG. 7, and FIG. 8, the wire plug-in grip 1B in the present embodiment is used as a main communication component. The wire plug-in grip 1B can be directly and electrically coupled to the electronic device 200, and can be electrically coupled to the wire take-up grip 1A through the connection wire 2. In other words, the gripping body 11 of the wire plug-in grip 1B in the present embodiment is provided with the communication module 4.

More specifically, the communication module 4 is electrically coupled to the signal generating module 12 and the second coupling portion 1123 that are located in a same one of the gripping bodies 11 (that is, the signal generating module 12 and the second coupling portion 1123 of the wire plug-in grip 1B). When the gripping unit 111 and the mounting unit 112 of the wire plug-in grip 1B are assembled with each other, the communication module 4 is electrically coupled to the connection wire 2 through a corresponding one of the first coupling portion 1113 and a corresponding one of the second coupling portion 1123, so that the communication module 4 is electrically coupled to the signal generating module 12 of the wire take-up grip 1A. Accordingly, the communication module 4 can receive any one of the control signals generated from the wire plug-in grip 1B and the wire take-up grip 1A, and can transmit the same to the electronic device 200.

It should be noted that, in the present embodiment, the communication module 4 and the signal generating module 12 that are located in the wire plug-in grip 1B are each an independent module, but the present disclosure is not limited thereto. For example, in certain embodiments of the present disclosure (not shown), the communication module 4 and the signal generating module 12 of the wire plug-in grip 1B can be integrally formed as a single module (or chip).

Referring to FIG. 4 and FIG. 7, the mounting unit 112 of the wire plug-in grip 1B includes a plug portion 1125 disposed on the second body portion 1121. The plug portion 1125 in the present embodiment is located in the abutting groove G1121, and is electrically coupled to the communication module 4 by the first coupling portion 1113 and the second coupling portion 1123 of the wire plug-in grip 1B. The plug portion 1125 can be electrically coupled to the electronic device 200, so that the communication module 4 and the electronic device 200 can transmit (input or/and output) data or power to each other. That is, the communication module 4 in the present embodiment is connected to the electronic device 200 in a wired manner.

In addition, it should be noted that the communication module 4 in the present embodiment can obtain an electric energy from the electronic device 200 through the plug portion 1125, and can input the electric energy to the two grips 1 (i.e., the wire take-up grip 1A and the wire plug-in grip 1B) to supply power through the connection wire 2. In other words, the controller 100A in the present embodiment is powered by the electronic device 200.

Referring to FIG. 3, the wire take-up grip 1A is installed with the wire take-up assembly 3A. In other words, the grip 1 corresponding to the wire take-up assembly 3A is defined as the wire take-up grip 1A. The wire take-up assembly 3A includes an accommodating body 31 and an operating component 32 that is disposed in the accommodating body 31.

Figure 10:
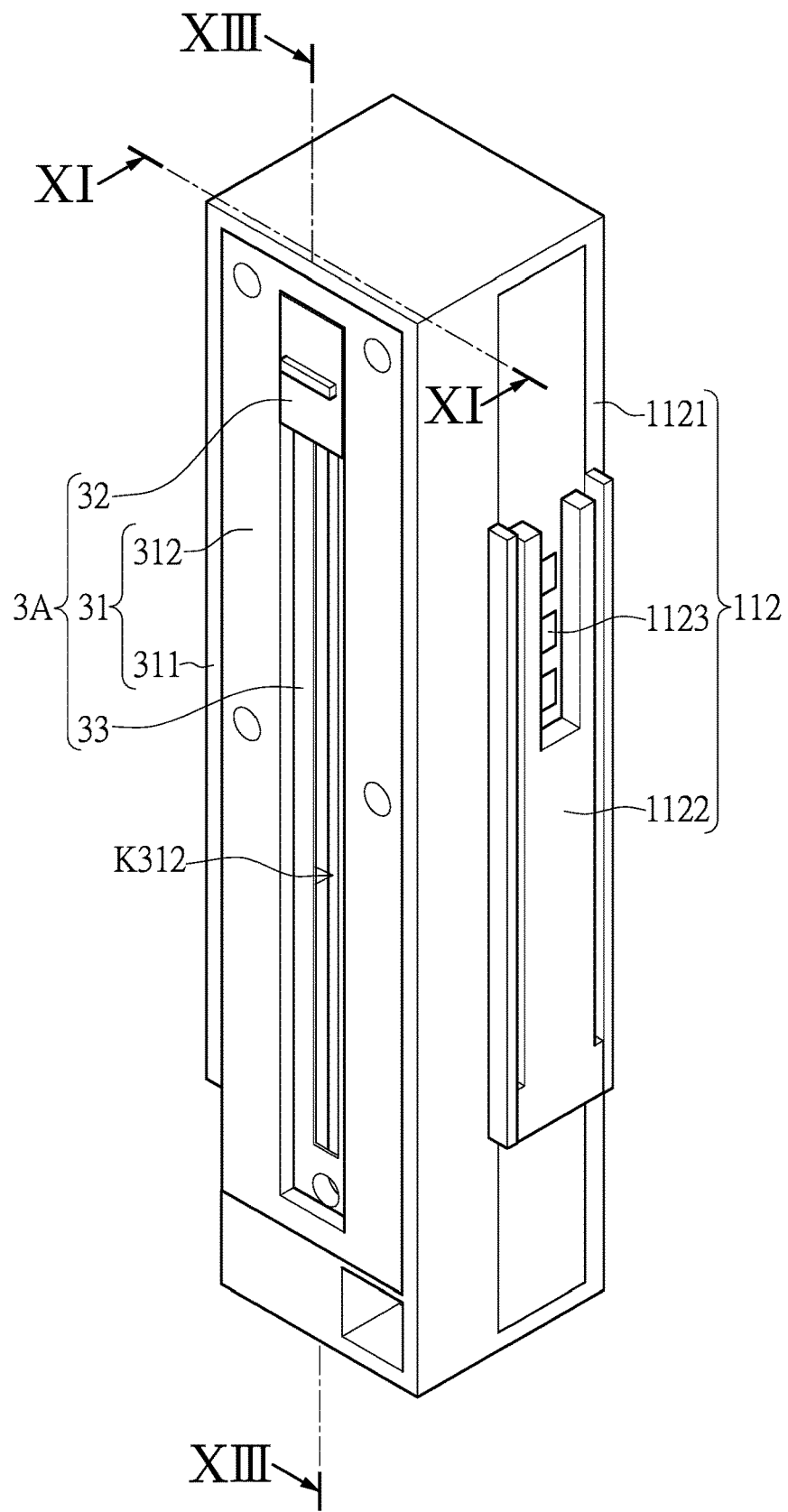
FIG. 10 is a schematic perspective view of a wire take-up assembly that is installed with the mounting unit according to the first embodiment of the present disclosure.
Figure 11:
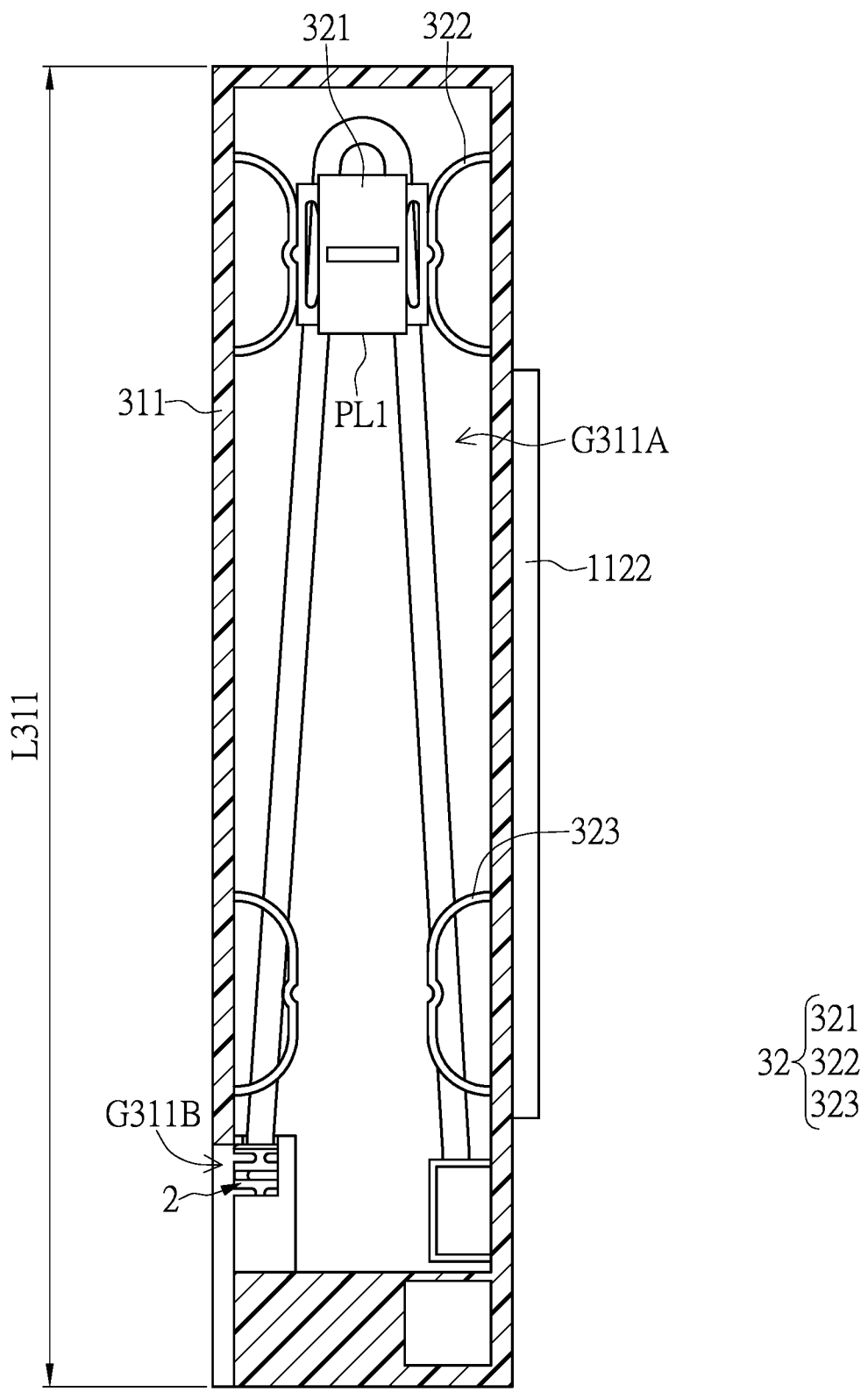
FIG. 11 is a cross-sectional view taken along line XI-XI of FIG. 10.
Figure 12:
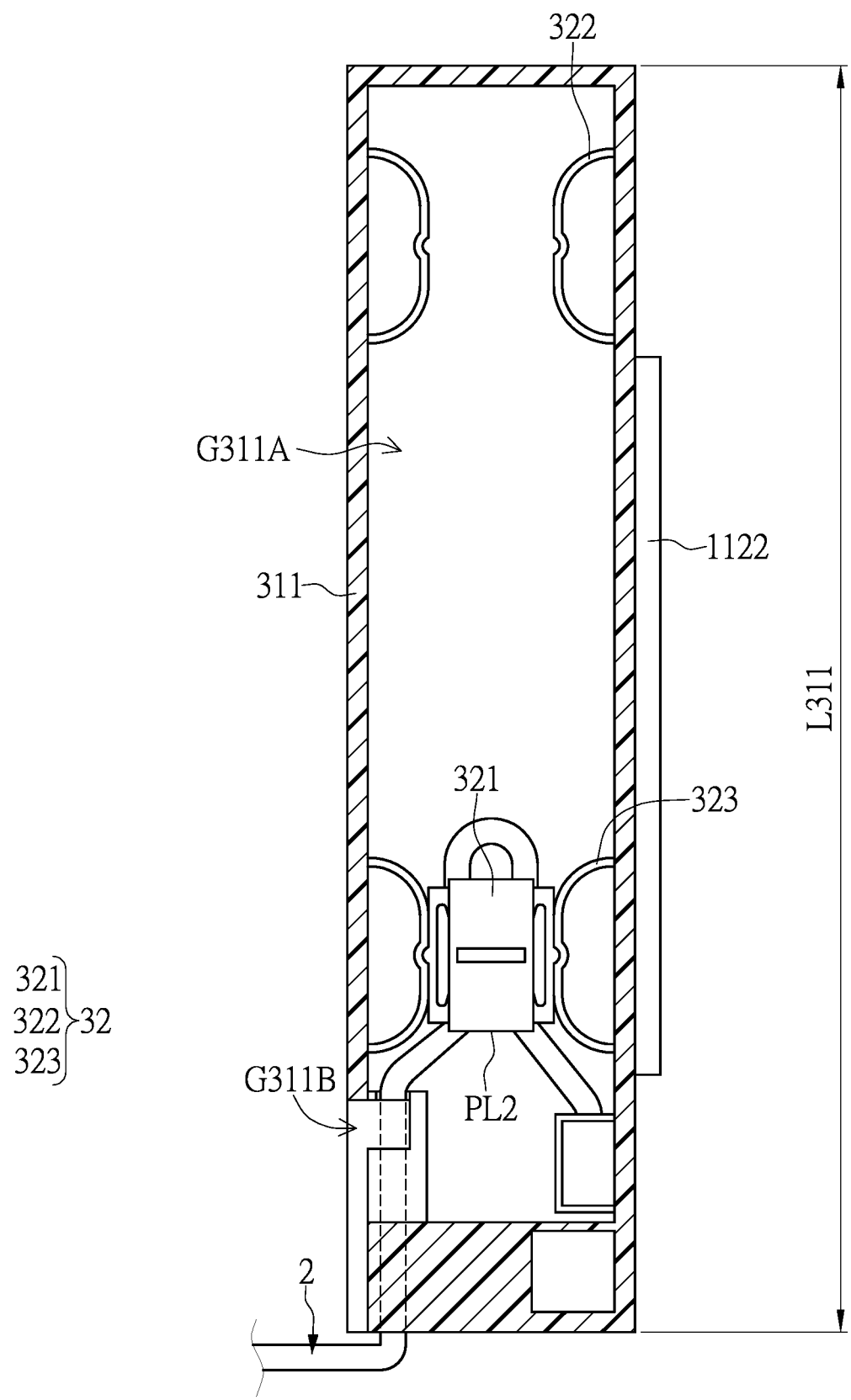
FIG. 12 is a schematic view showing an operating component being located at a release position according to the first embodiment of the present disclosure.

In detail, referring to FIG. 10 to FIG. 12, the accommodating body 31 in the present embodiment is located on the mounting unit 112 of the wire take-up grip 1A, and includes a frame portion 311, an accommodating groove G311A located on the frame portion 311, a side groove G311B that is in spatial communication with the accommodating groove G311A, and a cover portion 312 that is disposed on the frame portion 311.

The frame portion 311 is a frame structure in a rectangular shape, and the frame portion 311 in the present embodiment is integrally connected to the mounting unit 112, but the present disclosure is not limited thereto (e.g., each of the frame portion 311 and the mounting unit 112 may be a single one-piece structure, and the frame portion 311 and the mounting unit 112 are assembled with each other). A surface of the frame portion 311 away from the mounting unit 112 is recessed toward the mounting unit 112 to form the accommodating groove G311A. The side groove G311B is recessed from another surface of the frame portion 311 toward the accommodating groove G311A, and the side groove G311B is in spatial communication with the accommodating groove G311A. The accommodating groove G311A can accommodate a wire portion of the connection wire 2, and the side groove G311B can accommodate the plug member of the connection wire 2.

Figure 13:
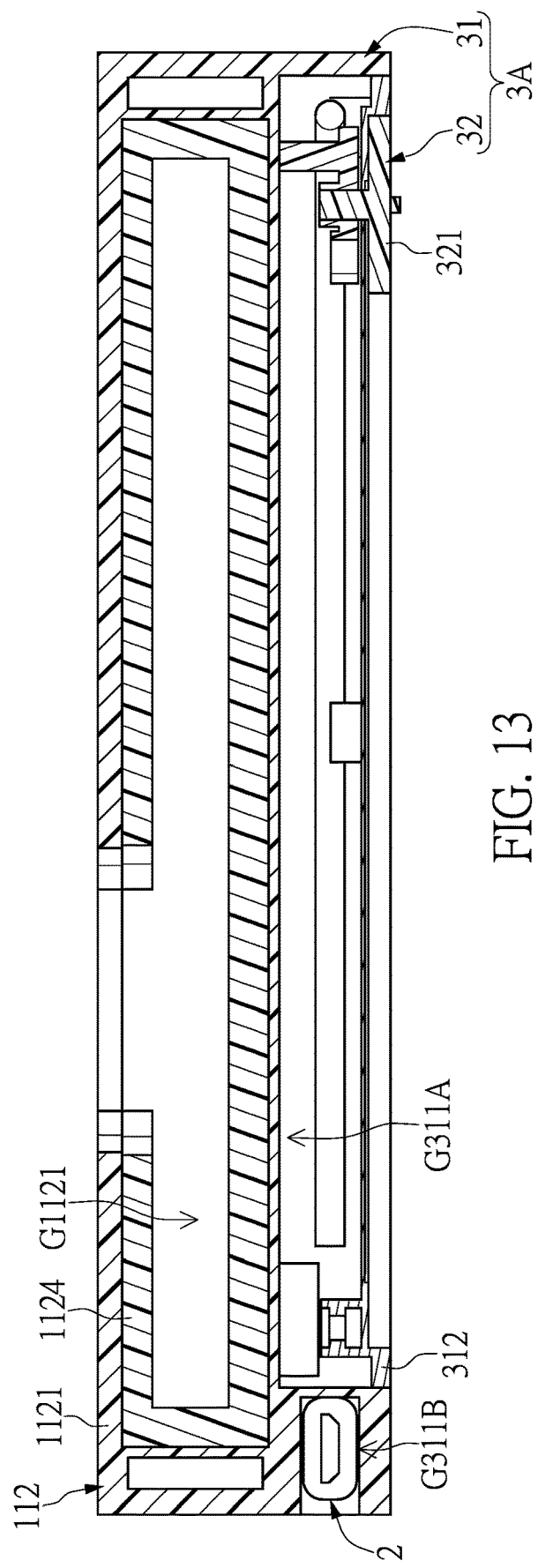
FIG. 13 is a cross-sectional view taken along line XIII-XIII of FIG. 10.

Referring to FIG. 10 and FIG. 13, the cover portion 312 covers the connection wire 2 located in the accommodating groove G311A. Specifically, the cover portion 312 in the present embodiment is a plate structure, and is detachably disposed on the frame portion 311. The cover portion 312 has a guide hole K312 that is in spatial communication with the accommodating groove G311A, and the guide hole K312 is arranged along a length direction (i.e., an extension direction of a length L311 shown in FIG. 11) of a corresponding one of the mounting unit 112 (i.e., the mounting unit 112 of the wire take-up grip 1A). The guide hole K312 can allow one part of the operating component 32 to pass through, so as to be slidably disposed in the frame portion 311. That is, another part of the operating component 32 is exposed from an outer side of the guide hole K312.

In an exemplary embodiment, the wire take-up assembly 3A further includes a cover member 33. The cover member 33 in the present embodiment has two pieces of soft bodies, and is disposed on an inner wall of the guide hole K312, so as to cover most of the guide hole K312. Accordingly, the cover member 33 can effectively prevent dust or foreign matter, etc., from directly falling into the accommodating groove G311A. Naturally, the cover member 33 can also be designed as a single-piece soft body or other structure that can cover the guide hole K312.

Referring to FIG. 11 to FIG. 13, a part of the operating component 32 is located in the accommodating groove G311A. The operating component 32 can move relative to the accommodating body 31, so as to drive the connection wire 2 to move in the accommodating groove G311A. Therefore, a part of the connection wire 2 exposed outside the accommodating groove G311A can be accommodated into the accommodating groove G311A (as shown in FIG. 1 and FIG. 2).

Specifically, the operating component 32 in the present embodiment includes a moving member 321 movably disposed on the frame portion 311, and a first clamping member 322 and a second clamping member 323 that are installed in the frame portion 311. One part of the moving member 321 is located in the accommodating groove G311A, so as to allow a part of the connection wire 2 located in the frame portion 311 to contact and partly surround the moving member 321. In other words, the moving member 321 can arrange the connection wire 2 located in the accommodating groove G311A to be in the shape of a letter V. Another part of the moving member 321 is exposed from an outer side of the frame portion 311 through the guide hole K312. In this way, the moving member 321 located outside the guide hole K312 can be operated by the user and move relative to the frame portion 311 along the guide hole K312, so as to drive the connection wire 2.

The first clamping member 322 and the second clamping member 323 are installed on opposite ends of the frame portion 311. The first clamping member 322 is located on one side of the accommodating groove G311A that is away from an entrance through which the connection wire 2 enters the accommodating groove G311A. The first clamping member 322 can clamp the moving member 321 at an accommodating position PL1 (as shown in FIG. 11), so that the accommodating groove G311A can accommodate the connection wire 2 to a maximum extent. In detail, when the moving member 321 is at the accommodating position PL1, a length of the connection wire 2 located in the accommodating groove G311A is greater than the length L311 of the frame portion 311, and is preferably more than twice the length L311 of the frame portion 31 (that is, the aforementioned maximum extent), but the present disclosure is not limited thereto.

The second clamping member 323 is located on another side of the accommodating groove G311A that is adjacent to the entrance through which the connection wire 2 enters the accommodating groove G311A. The second clamping member 323 can clamp the moving member 321 at a release position PL2 (as shown in FIG. 12), so that most of the connection wire 2 in the accommodating groove G311A can be released out of the accommodating groove G311A. In other words, when the moving member 321 is at the release position PL2, the length of the connection wire 2 located in the accommodating groove G311A is preferably less than the length L311 of the frame portion 311.

It should be additionally noted that, in certain embodiments of the present disclosure (not shown), the first clamping member 322 and the second clamping member 323 of the operating component 32 can be appropriately omitted according to practical requirements.

In addition, the operating component 32 in the present embodiment is guided to move through the guide hole K312 of the cover portion 312, but the present disclosure is not limited thereto. For example, in certain embodiments of the present disclosure (not shown), the frame portion 311 may also have a track, and the track can guide the operating component 32 to move. In other words, the cover portion can also be omitted in the wire take-up assembly 3A of this example.

Moreover, referring to FIG. 6, in the present embodiment, the wire take-up grip 1A further has a connection port 14 located on the gripping unit 111 thereof. The connection port 14 is electrically coupled to a corresponding one of the signal generating module 12, and can be electrically coupled to the communication module 4 by the connection wire 2. The connection port 14 can input an external power source or an external signal to the electronic device 200. In other words, the connection port 14 in practice can be a Micro-USB plug, a Type-c plug, or a sound source hole, but the present disclosure is not limited thereto. For example, the connection port 14 can also be configured on the mounting unit 112 of the wire take-up grip 1A.

In an exemplary embodiment, referring to FIG. 4, the controller 100A can further include two vibration components 5 respectively disposed in the two grips 1. The communication module 4 can receive a feedback signal transmitted by the electronic device 200, and can control the two vibration components 5 to generate vibration according to the feedback signal. Accordingly, the user can have a better operation experience.

SECOND EMBODIMENT

Figure 14:
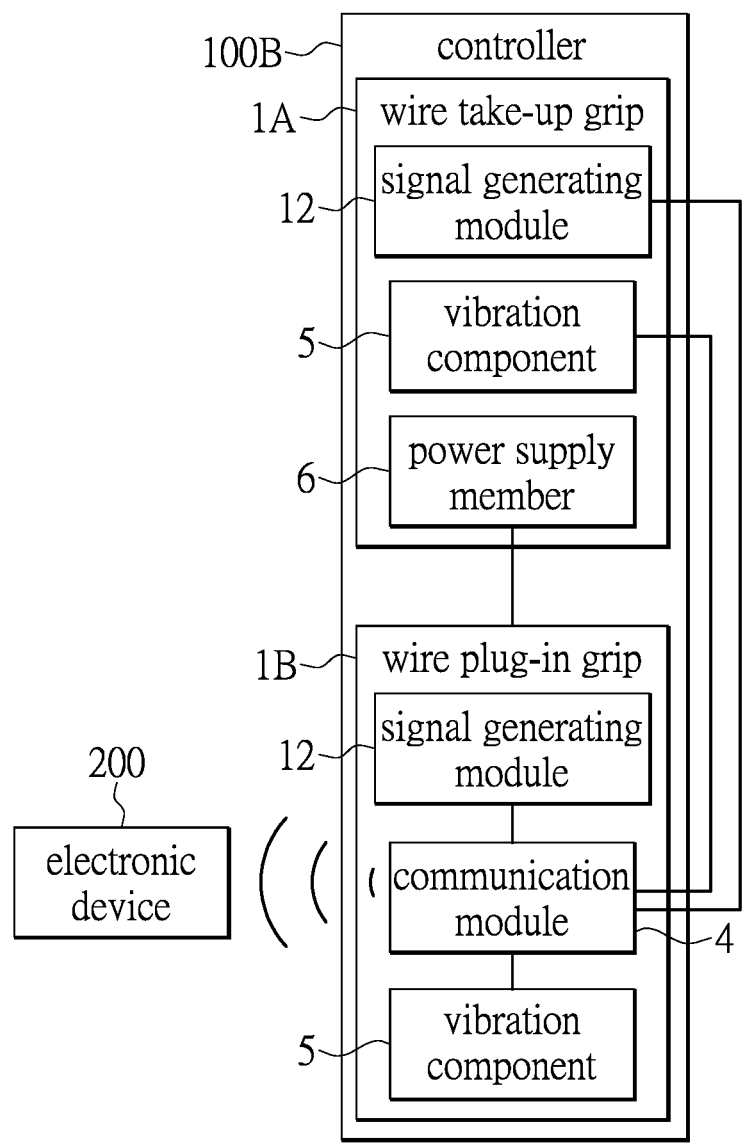
FIG. 14 is a circuit block diagram of the controller according to a second embodiment of the present disclosure.

Referring to FIG. 14, a second embodiment of the present disclosure provides a controller 100B. The present embodiment is similar to the first embodiment, and the similarities between the present embodiment and the first embodiment will not be repeated herein. The differences of the present embodiment from the first embodiment are mainly as follows.

The controller 100B in the present embodiment is connected to the electronic device 200 in a wireless manner, and the controller 100B is powered by an internal battery thereof. Specifically, the plug portion 1125 is omitted from the mounting unit 112 of the wire plug-in grip 1B, and the communication module 4 has a communication protocol that can match with the electronic device 200 (e.g., Bluetooth®, WI-FI®, ZIGBEE®, etc.), so that the communication module 4 can transmit data (e.g., the control signals or the feedback signal).

In addition, the controller 100B further includes a power supply member 6 and a counterweight member (not shown). The power supply member 6 is disposed in one of the two grips 1 and is electrically coupled to the connection wire 2, so as to provide power to the two grips 1. The counterweight member is disposed in another one of the two grips 1, and a weight of the counterweight member is substantially equal to a weight of the power supply member 6. Accordingly, in the controller 100B, the two grips 1 can have substantially the same weight through the power supply member 6 and the counterweight member, so as to provide the user with an ideal operation experience, but the present disclosure is not limited thereto.

For example, in certain embodiments of the present disclosure (not shown), the controller 100B can also include two power supply members 6 having substantially the same weight, and the two power supply members 6 are respectively disposed in the two grips 1. This configuration also allows the user to have the ideal operation experience and the controller 100B to have an ideal battery life.

THIRD EMBODIMENT

Figure 15:
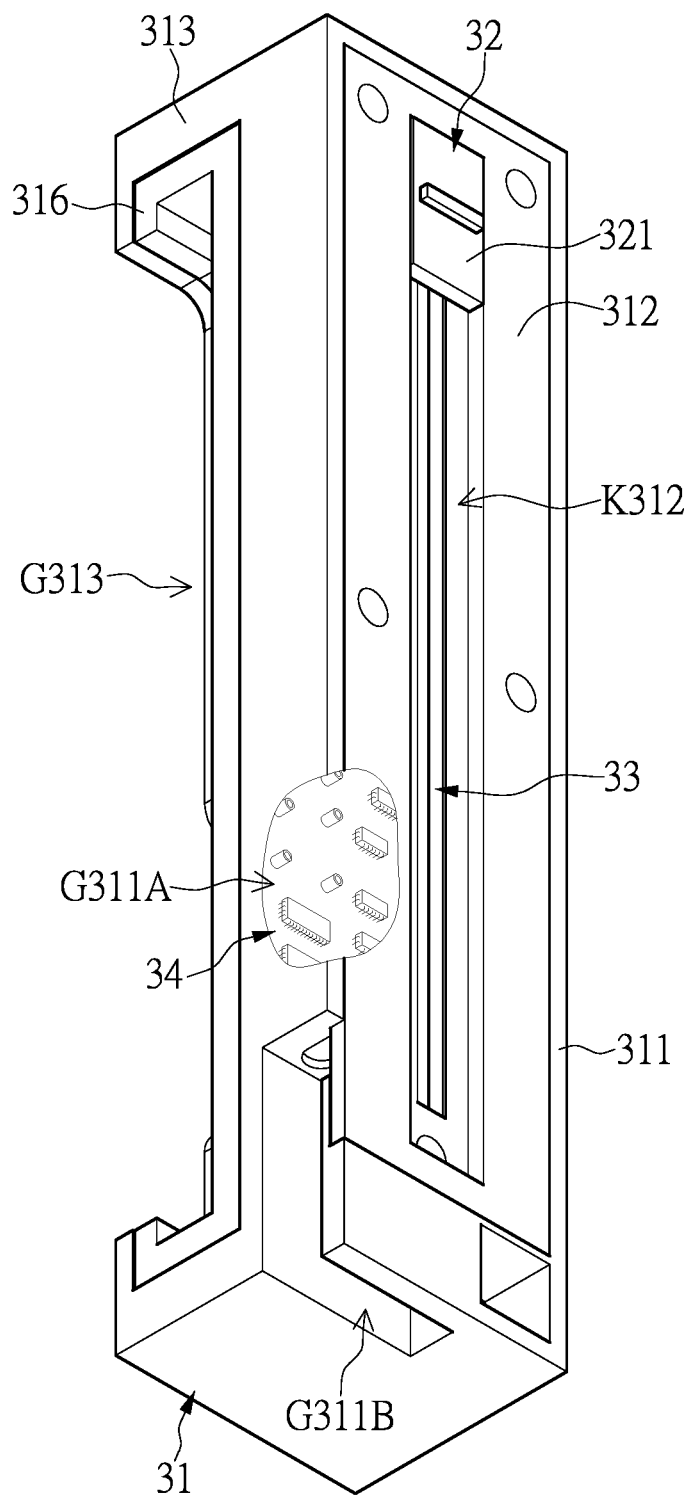
FIG. 15 is a schematic perspective view of the wire take-up assembly according to a third embodiment of the present disclosure.
Figure 16:
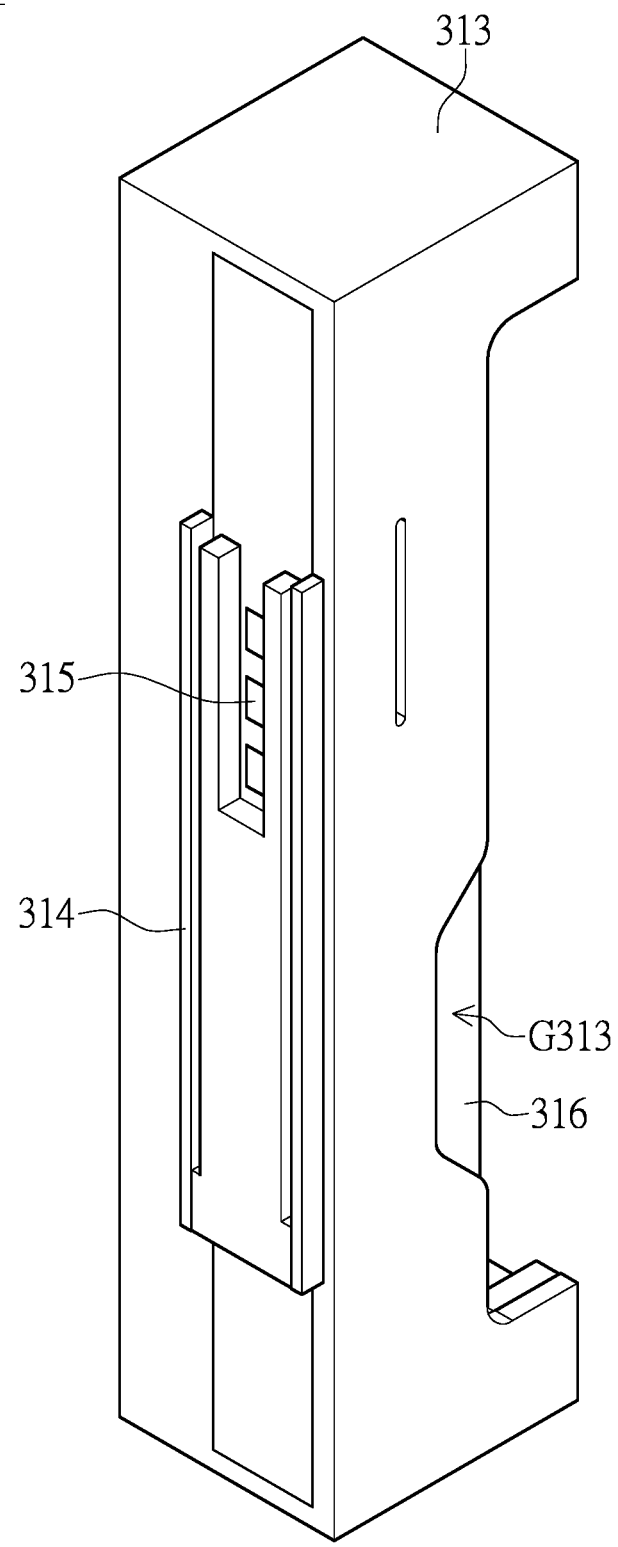
FIG. 16 is another schematic perspective view of the wire take-up assembly according to the third embodiment of the present disclosure.

Referring to FIG. 15 and FIG. 16, a third embodiment of the present disclosure provides a wire take-up assembly 3B. The wire take-up assembly 3B in the present embodiment is similar to the wire take-up assembly 3A of the controller 100A in the first embodiment, and the similarities between the present embodiment and the first embodiment will not be repeated herein. The difference between the present embodiment and the first embodiment mainly resides in that the wire take-up assembly 3B in the present embodiment has the function of the mounting unit 112 of the first embodiment, and has a communication module 34, so that the wire take-up assembly 3B can be used to assemble in a grip that does not include a communication module. In other words, the wire take-up assembly 3B in the present embodiment can be installed on grips that have different configurations (e.g., different button arrangements).

The accommodating body 31 of the wire take-up assembly 3B in the present embodiment further includes a body portion 313 connected to the frame portion 311, and a holding portion 314 and a coupling portion 315 that are disposed on the body portion 313. The body portion 313 is a substantially C-shaped structure and has an abutting groove G313, and the abutting groove G313 can abut against an edge of the electronic device 200, so that the body portion 313 can be fixed on the electronic device 200.

Naturally, in an exemplary embodiment, the accommodating body 31 may also be provided with an elastic layer 316 in the abutting groove G313, and the elastic layer 316 can be properly deformed to abut against the edge of the electronic device 200, thereby ensuring that the electronic device 200 is fixed and absorbing an external force when the electronic device 200 is impacted.

The holding portion 314 is a track structure and is formed by extending from a side surface of the body portion 313. The holding portion 314 can be assembled on the first holding portion 1112 of the gripping unit 111 of the grip 1.

The coupling portion 315 is a conductive member (e.g., an edge connector), and is located on a side surface of the body portion 313 that has the holding portion 314. The coupling portion 315 can be electrically coupled to the signal generating module 12 of the grip 1.

In addition, the communication module 34 of the wire take-up assembly 3B is installed in the accommodating body 31, and can be electrically coupled to the grip 1 by the coupling portion 315 and a corresponding one of the first coupling portions 1113, so that the communication module 34 can transmit the control signals of the grip 1 to the electronic device 200.

BENEFICIAL EFFECTS OF THE EMBODIMENTS

In conclusion, by virtue of "the operating component being configured to move relative to the accommodating body, so that the connection wire in the accommodating groove is pulled by the operating component and the part of the connection wire exposed outside the accommodating groove is accommodated into the accommodating groove," the controller and the wire take-up assembly thereof provided by the present disclosure can quickly accommodate the connection wire.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wire take-up assembly of a controller, wherein the wire take-up assembly is configured to be installed on a grip, so as to accommodate a connection wire, the wire take-up assembly comprising:
   an accommodating body including a frame portion and a cover portion, wherein the frame portion has an accommodating groove that is configured to accommodate a part of the connection wire, and the cover portion is installed on the frame portion and covers the connection wire located in the accommodating groove, and wherein the cover portion has a guide hole; and
   an operating component, wherein a part of the operating component is located in the accommodating groove and passes through the guide hole, so as to be slidably disposed on the frame portion; wherein the operating component is configured to move relative to the accommodating body, so that the connection wire in the accommodating groove is pulled by the operating component and a part of the connection wire exposed outside the accommodating groove is accommodated into the accommodating groove;
   wherein the operating component includes a moving member, and a first clamping member and a second clamping member that are installed in the frame portion;
   wherein the moving member is configured to allow a part of the connection wire that is located in the frame portion to contact and partly surround the moving member;
   wherein the first clamping member is located at one of two ends of the frame portion, and the first clamping member is configured to clamp the moving member at an accommodating position; wherein, when the moving member is located at the accommodating position, a length of the connection wire located in the accommodating groove is greater than a length of the frame portion; and
   wherein the second clamping member is located at another one of the two ends of the frame portion that is away from the first clamping member, and is configured to clamp the moving member at a release position; wherein, when the moving member is located at the release position, the length of the connection wire located in the accommodating groove is less than the length of the frame portion.

2. The wire take-up assembly according to claim 1, wherein the accommodating body includes a holding portion and a coupling portion, and the holding portion is configured to be detachably disposed on the grip; wherein, when the wire take-up assembly is disposed on the grip through the holding portion, the coupling portion is configured to allow the connection wire and the grip to be electrically coupled to each other.

3. The wire take-up assembly according to claim 1, further comprising a cover member disposed on an inner wall of the guide hole.

4. The wire take-up assembly according to claim 1, further comprising a communication module installed in the accommodating body, wherein the communication module is configured to be electrically coupled to the grip, and is configured to transmit a control signal generated from the grip to an electronic device.

5. The wire take-up assembly according to claim 4, further comprising a connection port disposed on the accommodating body, wherein the connection port is electrically coupled to the communication module, and is configured to input an external power source or an external signal to the electronic device.

6. A controller configured for being installed on two sides of an electronic device, the controller comprising:
   two grips, wherein each of the two grips includes:
      a gripping body, wherein the gripping body includes a mounting unit and a gripping unit, the mounting unit is configured to be disposed on one of the two sides of the electronic device, and the gripping unit is assembled to the mounting unit;
      a signal generating module disposed in the gripping body; and
      a plurality of operating members, wherein each of the operating members is electrically coupled to the signal generating module, and is configured to be operated such that the signal generating module generates a plurality of control signals that respectively correspond to the operating members;
   a connection wire, wherein one of two ends of the connection wire is electrically coupled to one of the signal generating modules of the two grips, and another one of the two ends of the connection wire has a plug member configured to be pluggably and electrically coupled to another one of the signal generating modules of the two grips;
   a wire take-up assembly installed on one of the two grips, wherein the wire take-up assembly includes:
      an accommodating body having an accommodating groove, wherein the accommodating groove is configured to accommodate a part of the connection wire, and the plug member of the connection wire is exposed from the accommodating body; and an operating component, wherein a part of the operating component is located in the accommodating groove; wherein the operating component is configured to move relative to the accommodating body, so that the connection wire in the accommodating groove is pulled by the operating component and a part of the connection wire exposed outside the accommodating groove is accommodated into the accommodating groove; and a communication module disposed in one of the gripping bodies of the one of the two grips and electrically coupled to one of the signal generating modules of the two grips that is located in the one of the gripping bodies of the one of the two grips, wherein the communication module is electrically coupled to another one of the signal generating modules of the two grips through the connection wire, and the communication module is configured to receive and transmit any one of the control signals to the electronic device.

7. The controller according to claim 6, wherein each of the gripping bodies of the two grips includes:
a first body portion;
a first holding portion disposed on the first body portion; and
a first coupling portion disposed on the first body portion and electrically coupled to a corresponding one of the signal generating modules of the two grips;
wherein each of the mounting units includes:
a second body portion;
a second holding portion disposed on the second body portion, wherein the second holding portion is detachably assembled on a corresponding one of the first holding portion; and
a second coupling portion disposed on the second body portion and electrically coupled to the connection wire;
wherein, when the first holding portion of any one of the two grips and the second holding portion that corresponds to the any one of the two grips are assembled with each other, the first coupling portion and the second coupling portion are electrically coupled to each other.

8. The controller according to claim 6, wherein the accommodating body includes a frame portion and a cover portion, the frame portion has the accommodating groove, and the cover portion is installed on the frame portion and covers the connection wire located in the accommodating groove; wherein the cover portion has a guide hole, and a part of the operating component passes through the guide hole and is slidably disposed on the frame portion.

9. The controller according to claim 8, wherein the wire take-up assembly includes a cover member disposed on an inner wall of the guide hole.

10. The controller according to claim 6, wherein the operating component includes a moving member and a first clamping member that is installed in the frame portion, and the moving member is configured to allow a part of the connection wire that is located in the frame portion to contact and partly surround the moving member; wherein the first clamping member is located at one of two ends of the frame portion, and the first clamping member is configured to clamp the moving member at an accommodating position; wherein, when the moving member is located at the accommodating position, a length of the connection wire located in the accommodating groove is greater than a length of the frame portion.

11. The controller according to claim 10, wherein the operating component includes a second clamping member that is installed in the frame portion; wherein the second clamping member is located at another one of the two ends of the frame portion that is away from the first clamping member, and is configured to clamp the moving member at a release position; wherein, when the moving member is located at the release position, the length of the connection wire located in the accommodating groove is less than the length of the frame portion.

12. The controller according to claim 6, wherein any one of the two grips includes a connection port that is electrically coupled to the communication module and is configured to input an external power source or an external signal to the electronic device.

13. The controller according to claim 6, further comprising a power supply member and a counterweight member, wherein the power supply member is disposed in one of the two grips and is electrically coupled to the connection wire, so as to provide power to the two grips; wherein the counterweight member is disposed in another one of the two grips, and a weight of the counterweight member is equal to a weight of the power supply member.

14. The controller according to claim 6, wherein the communication module is connected to the electronic device in a wired or a wireless manner, so as to transmit the control signals generated from each of the two grips to the electronic device and receive a feedback signal generated from the electronic device; wherein the controller further includes two vibration components respectively disposed in the two grips, and the communication module is configured to control the two vibration components to generate vibrations according to the feedback signal.

15. The controller according to claim 6, wherein the communication module is connected to the electronic device in a wired manner, and is configured to obtain electric energy from the electronic device; wherein the communication module is configured to input the electric energy to the two grips through the connection wire.

* * * * *